United States Patent
MacLeod (10) Patent No.: US 7,274,311 B1
(45) Date of Patent: Sep. 25, 2007

(54) ANIMATED DISPLAY OF TRAFFIC INFORMATION

(75) Inventor: John MacLeod, Winnetka, IL (US)

(73) Assignee: Navteq North America, LLC, Chicago, IL (US)

( * ) Notice: Subject to any disclaimer, the term of this patent is extended or adjusted under 35 U.S.C. 154(b) by 182 days.

(21) Appl. No.: 11/110,550

(22) Filed: Apr. 20, 2005

(51) Int. Cl.
*G08G 1/123* (2006.01)
(52) U.S. Cl. .................... 340/995.13; 701/119
(58) Field of Classification Search ............ None
See application file for complete search history.

(56) References Cited

U.S. PATENT DOCUMENTS

| | | | |
|---|---|---|---|
| 5,699,056 A * | 12/1997 | Yoshida | 340/905 |
| 5,724,644 A * | 3/1998 | Wassink et al. | 340/7.51 |
| 6,952,643 B2 * | 10/2005 | Matsuoka et al. | 701/117 |
| 7,116,326 B2 * | 10/2006 | Soulchin et al. | 345/440 |
| 2005/0027448 A1 * | 2/2005 | Takenaga et al. | 701/211 |
| 2005/0143902 A1 * | 6/2005 | Soulchin et al. | 701/117 |
| 2007/0038362 A1 * | 2/2007 | Gueziec | 701/117 |

* cited by examiner

*Primary Examiner*—Benjamin C. Lee
(74) *Attorney, Agent, or Firm*—Frank J. Kozak; Jon D. Shutter (57) ABSTRACT

A method is disclosed for displaying traffic information on a display. Information that indicates traffic conditions on a portion of a road network is used to form an animation. The portion of the road network is shown on the display and the animation is shown on the portion of the road network being displayed. The animation simulates movement in a direction corresponding to the direction of vehicle travel along the portion of the road network being displayed. The speed of the simulated movement of the animation is related to the traffic conditions.

21 Claims, 6 Drawing Sheets

ANIMATED DISPLAY OF TRAFFIC INFORMATION

BACKGROUND OF THE INVENTION

The present invention relates to displaying traffic information on a representation or display of a portion of a road network on a display screen.

Vehicle drivers, as well as others, rely on timely and accurate traffic information. Traffic information can be delivered in various ways, such as by audio messages or visually. One way to present traffic information visually is on a map display. The visual presentation of traffic information provides the advantage that a user can quickly grasp relevant information about traffic congestion and compare traffic conditions on different routes.

There are various sources that provide traffic information visually. For example, traffic information is provided visually from Internet web sites. Traffic information is also provided visually on devices with wireless communications capabilities, such as mobile phones, personal digital assistants, personal navigation systems, or in-vehicle navigation systems.

Figure 1:
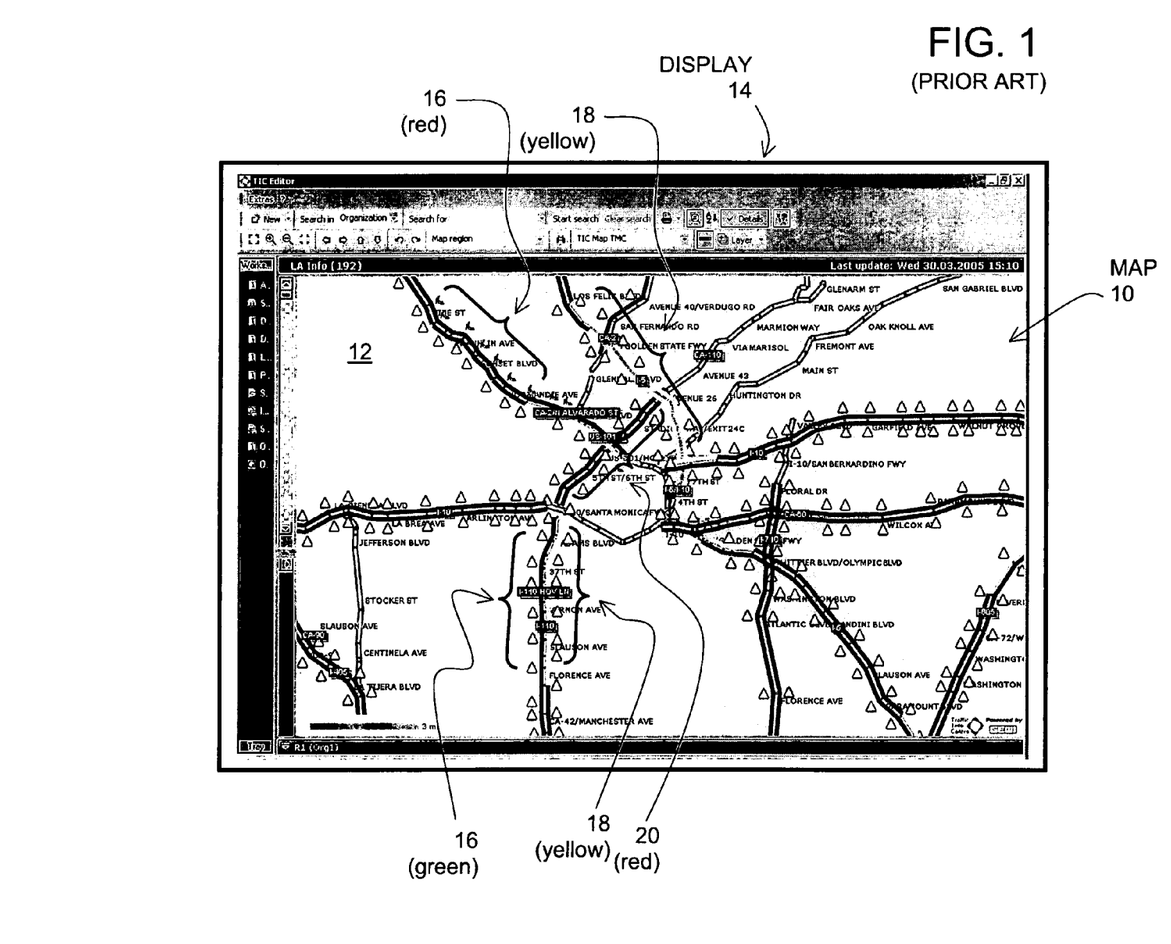
FIG. 1 illustrates a map display showing a portion of a road network with traffic conditions indicated by a conventional method that uses different colors to indicate traffic conditions along some of the roads.

One conventional type of map display that includes traffic information is shown in FIG. 1. In FIG. 1, a map 10 of a geographic region 12 is rendered on a display 14. The display 14 may be connected to or part of a personal computer, a mobile phone, a personal digital assistant, a personal navigation system, or other electronic device. This map 10 shows part of the road network located in the region 12. Traffic conditions on some of the roads are indicated on the map 10. In this figure, different traffic conditions are indicated by different colors. Along portions 16 of roads where traffic is flowing relatively quickly, e.g., 40 mph or higher, the road is depicted in a selected color, e.g., green. Along portions 18 of roads where traffic is flowing slower, e.g., 20-40 mph, the road is depicted in a different selected color, e.g., yellow. Along portions 20 of roads where traffic is flowing even more slowly, e.g., less than 20 mph, the road is depicted in another selected color, e.g., red.

Another conventional way to indicate traffic on a map display is to show numbers adjacent to a selected roadway where the numbers indicate the average vehicle speed along the roadways.

Although these ways of indicating traffic conditions along roads are useful, there exists room for improvements. For example, using different colors may make the map harder to read or understand. Where numbers indicating average vehicle speeds are used, they may be hard to read or interpret. Accordingly, there is a need for further ways to indicate traffic conditions to a user.

SUMMARY OF THE INVENTION

To address these and other objectives, the present invention includes a method for displaying traffic information on a display. Information that indicates traffic conditions on a portion of a road network is used to form an animation. The portion of the road network is shown on the display and the animation is shown on the portion of the road network being displayed. The animation simulates movement in a direction corresponding to the direction of vehicle travel along the portion of the road network being displayed. The speed of the simulated movement of the animation is related to the traffic conditions. For example, the animation simulates faster movement when the information about the traffic conditions indicates that traffic is moving relatively fast. The animation simulates slower movement when the information about the traffic conditions indicates that traffic is moving relatively slower.

DETAILED DESCRIPTION OF THE PRESENTLY PREFERRED EMBODIMENTS

I. First Embodiment

Figure 2:
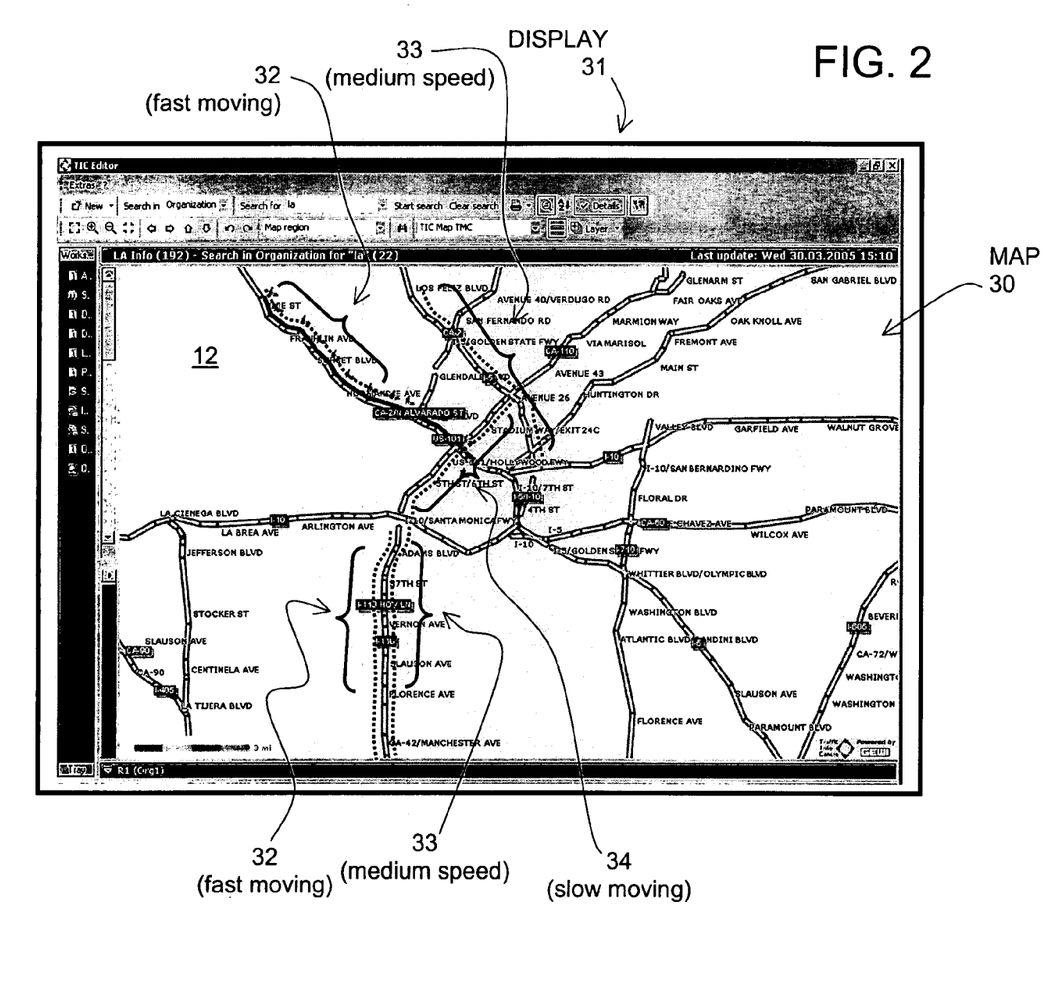
FIG. 2 illustrates a map display showing the same portion of the road network as shown in FIG. 1 with traffic conditions indicated according to a first embodiment of the present invention.

FIG. 2 shows an example of the first embodiment of the traffic display method. FIG. 2 shows a map 30 of the same geographic region 12 as shown in FIG. 1. The map 30 is shown on a display 31 which may be connected to or part of a personal computer, a mobile phone, a personal digital assistant, a personal navigation system, an in-vehicle navigation system or other electronic device. This map 30 shows part of the road network located in the region 12.

In the embodiment shown in FIG. 2, traffic is indicated on selected roadways. Note that traffic conditions may not be indicated for all the roads being displayed on the map display. Generating a map and associating traffic conditions at known locations to positions displayed on the map are known to those of skill in the art. Methods are disclosed in U.S. Pat. Nos. 6,092,076, 6,163,749, and 6,438,561, the entire disclosures of which are incorporated by reference herein.

In the embodiment shown in FIG. 2, traffic is indicated on selected roadways using animation. In this embodiment, the animation consists of a dashed line in which the dashes simulate movement. According to this embodiment, a dashed line is associated with each portion of road for which traffic conditions are indicated. In this embodiment, the direction of the simulated movement of the dashes in the dashed line corresponds to the direction of vehicle travel along the associated represented portion of roadway.

In this embodiment, the relative speed of movement of each animation is related to the reported speed of traffic along the associated represented portion of roadway. Thus, along portions 32 of roads where traffic is moving relatively faster, the simulated movement of the dashes that comprise the dashed line associated with the represented roadway on the map display is relatively fast. Along portions 33 of roads where traffic is moving more slowly, the simulated movement of the dashes that comprise the dashed line associated with the represented roadway on the map display is relatively slower. Along portions 34 of roads where traffic is moving slowest, the simulated movement of the dashes that comprise the dashed line associated with the represented roadway on the map display is relatively slowest.

The animated dashed lines may be all the same color. Alternatively, the animated dashed lines may be different colors. For example, animated dashed lines representing fast moving traffic may be green, animated dashed lines representing slower moving traffic may be yellow, and animated dashed lines representing the slowest moving traffic may be red.

The dashes in the animated dashed lines may be all the same length. Alternatively, the dashes in the animated dashed lines may be different lengths.

The embodiment shown in FIG. 2 is formed using traffic data matched to a computer-generated map depicting a portion of a roadway. The traffic data may be obtained from any of various sources. The traffic data may also be in various different formats. In this embodiment, the traffic data identifies a location along a road, an indication of the traffic speed, and an affected direction. The traffic data may also include additional information, such as the distance or extent along the road that the condition exists and the duration for which the condition is expected to exist. Examples of traffic message formats or systems that can be used in the formation of the embodiment shown in FIG. 2 include ALERT-C, GATS, VICS, and ITS.

EXAMPLE

Figure 3A:
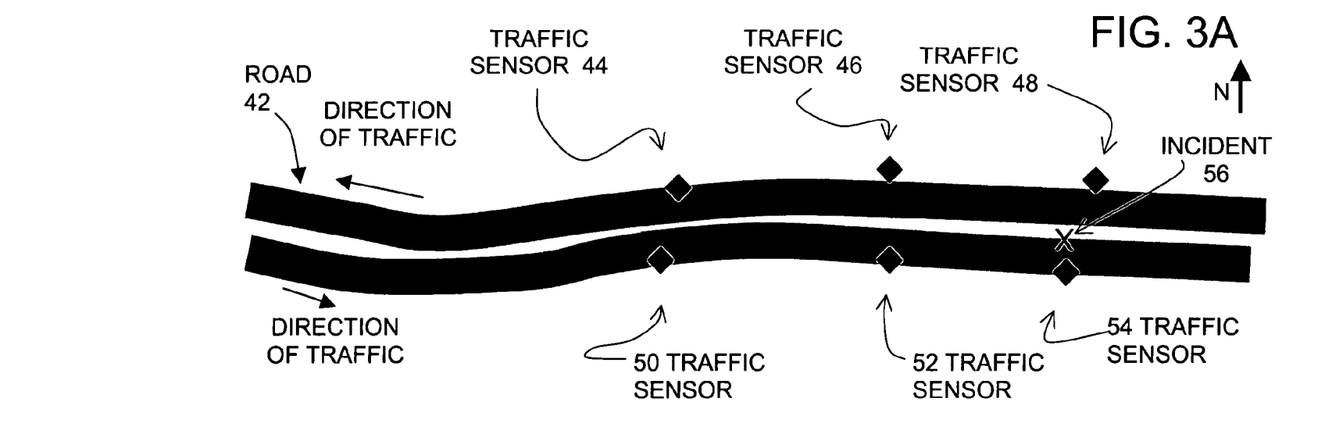
FIG. 3A illustrates a portion of a road along which traffic is monitored.
Figure 3B:
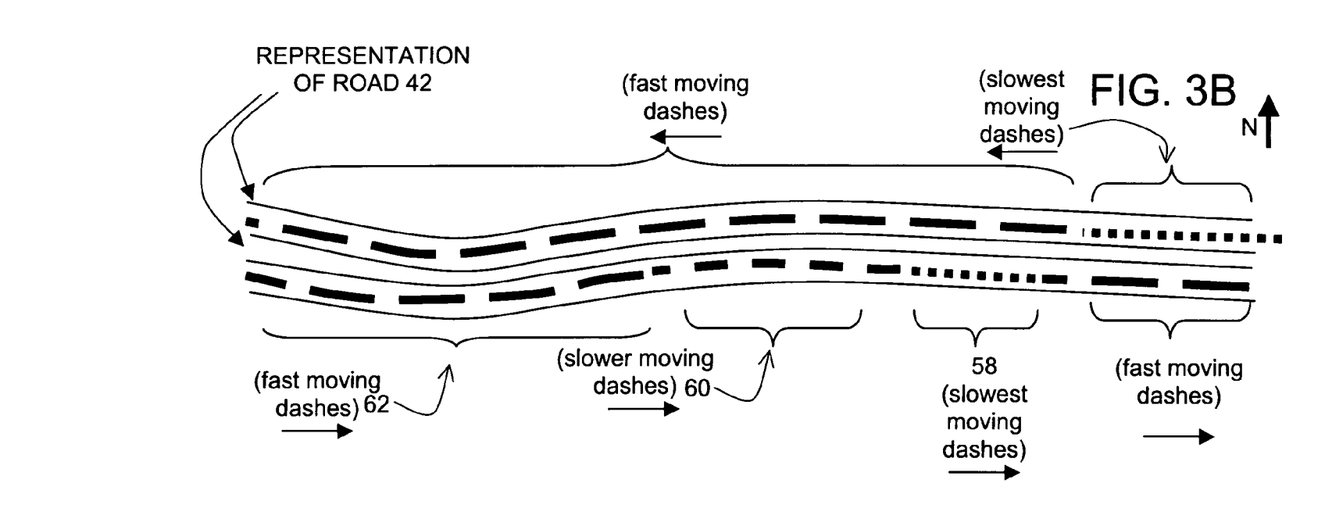
FIG. 3B illustrates how the traffic is displayed along a representation of the portion of road shown in FIG. 3A, according to the first embodiment.

FIGS. 3A and 3B show an example that further illustrates the embodiment shown in FIG. 2.

FIG. 3A shows a single section of road 42. The section of road 42 shown in FIG. 3A is part of a divided highway. Traffic information about the section of road 42 is available. In the example of FIG. 3A, the traffic information about the section of road 42 is obtained from sensors 44, 46, 48, 50, 52 and 54 that are located at specific positions along the road 42. These sensors measure a property or parameter from which average vehicle speeds at a point adjacent to the sensor on the roadway 42 in a given direction can be determined.

In this example, a traffic incident has occurred at the location adjacent to the sensor 54 along the road 42. The traffic incident is causing eastbound and westbound traffic to slow down in either direction from that point adjacent the sensor 54.

FIG. 3B shows a rendering of the road 42 on a map display. Map data from a geographic database is used to indicate the shape of the road. Map data may also be used to indicate any labels or names for the road 42 or for cross streets, municipal boundaries, points of interest, etc., that might be displayed.

In FIG. 3B, the traffic information obtained from the sensors 44, 46, 48, 50, 52 and 54 is used to create animations to indicate the traffic conditions along the representation of the road 42. For example, the traffic information from the sensor 54 in FIG. 3A indicates very slow moving eastbound traffic. Therefore, on the represented portion 58 of the road 42 in FIG. 3B, the traffic is represented by an animation consisting of a series of slow moving dashes along the represented eastbound section of the road 42. The sensor 52 in FIG. 3A indicates not-as-slow moving eastbound traffic. Therefore, on the represented portion 60 of the road 42 in FIG. 3B, the traffic is represented by an animation consisting of a series of not-so-slow moving dashes along the represented eastbound section of the road 42. The sensor 50 in FIG. 3A indicates fast moving eastbound traffic. Therefore, on the represented portion 62 of the road 42 in FIG. 3B, the traffic is represented by an animation consisting of a series of fast moving dashes along the represented eastbound section of the road 42.

FIG. 3B demonstrates one of the advantages of the disclosed method for depicting traffic conditions. When traffic conditions change along sections of the same road, the different traffic conditions are displayed by animations that clearly illustrate the differences in traffic flow. For example, if simulated moving dashes are used to indicate traffic flow, the simulated movement of the dashes is faster along the sections of a road on which the traffic conditions are faster and slower along the sections of the road on which the traffic conditions are slower. These sections may be adjacent to each other so that the fast moving dashes are shown slowing down into the slower moving dashes. This effect may help convey the traffic conditions more clearly than other, more conventional methods.

II. Second Embodiment

Figure 4:
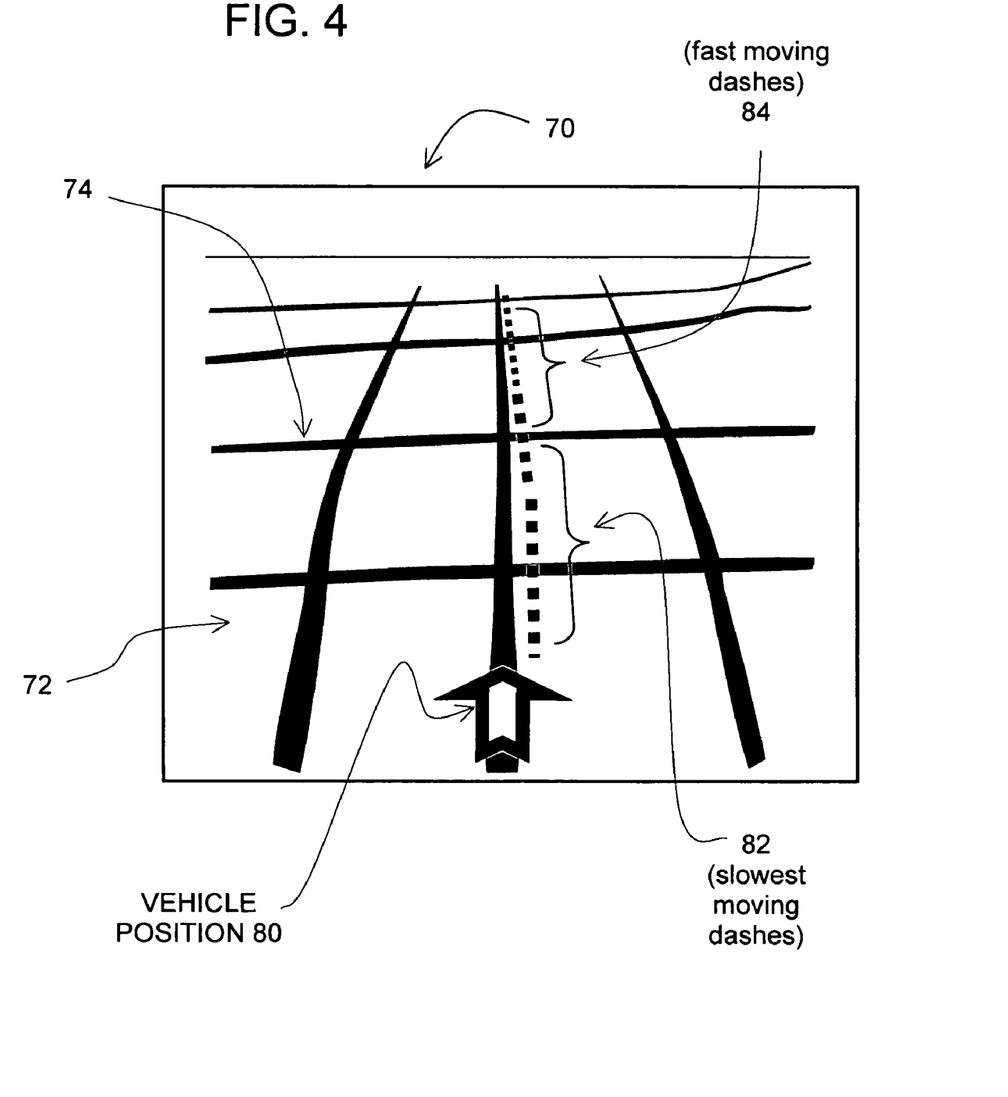
FIG. 4 illustrates another embodiment for displaying traffic along a representation of a portion of a road.

FIG. 4 shows an example of the second embodiment of the traffic display method. FIG. 4 shows a display 70 with a perspective or 3D view map 72 of a portion of a road network 74 located in a geographic region. The display 70 may be part of a system, such as a vehicle navigation system, a personal navigation system, a personal digital assistant, a mobile phone, a personal computer, or other device.

In a perspective or 3D view, the vantage point of the map image is overhead, but the viewing angle is not straight down. Instead, the viewing angle is slanted toward the ground in a direction other than straight down. Because the viewing angle is slanted, roads and other geographic features in the map image are rendered so that they appear in perspective. The map data used to render the perspective or 3D map view may be 2 dimensional (e.g., latitude, longitude) or 3 dimensional (e.g., latitude, longitude and altitude). The data in the map database may also include 3 dimensional features, such as buildings. When rendering a map image in perspective view, the map display application may transpose or otherwise process the data accessed from the map database so that it appears in perspective view.

FIG. 4 also shows a marker 80 that indicates the current position of the user relative to the map of the portion of the road network being displayed. The current position of the user may be determined by various different methods, such as GPS, remote mobile positioning (e.g., time-of-arrival, direction-of-arrival, signal strength, triangulation), dead reckoning, inertial systems, user input, WiFi, RFID, Loran, or combinations of these or other systems.

In this embodiment, traffic conditions along the road on which the user is traveling are measured. Information that indicates the traffic conditions is provided to the system of which the display 70 is a part. As in the previous embodiment, the traffic conditions may be measured by various means. Likewise, there are various known methods for the collection and processing of the traffic information and the transmission of traffic information to users.

In the embodiment shown in FIG. 4, traffic is indicated on the selected road using animation 82, 84. In this embodiment, the animation 82, 84 consists of a dashed line in which the dashes simulate movement. In this embodiment, the direction of the simulated movement of the dashes in the dashed line corresponds to the direction of traffic flow along the associated represented portion of roadway.

In FIG. 4, the animation is comprised of two parts. The first part of the animation 82 is relatively slow moving, i.e., the dashes simulate relatively slow movement. This is because the traffic information indicates that traffic flow along this portion of the road is relatively slow. The second part of the animation 84 is relatively fast moving, i.e., the dashes simulate relatively fast movement. This is because the traffic information indicates that traffic flow along this portion of the road is relatively fast.

III. Third Embodiment

Figure 5:
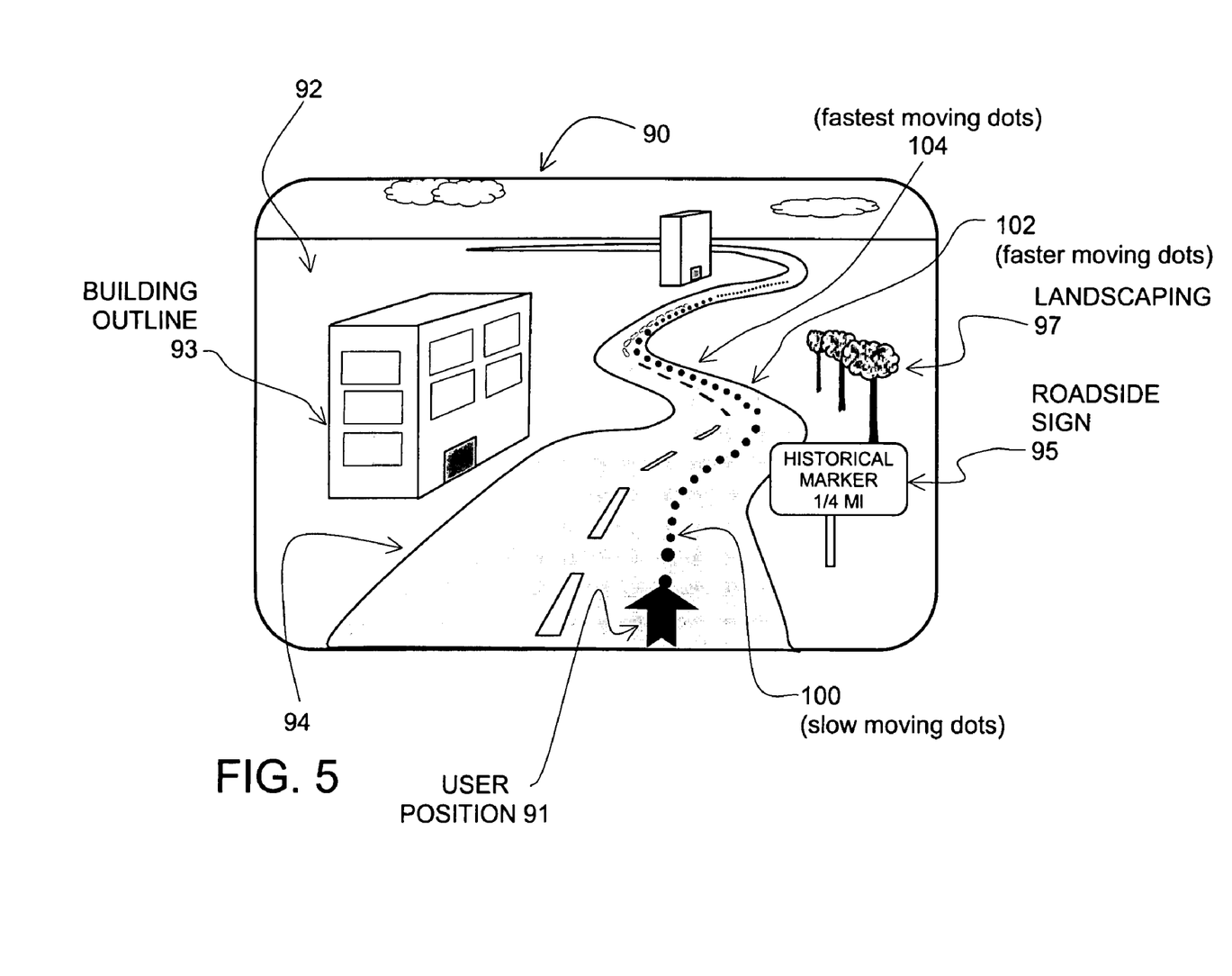
FIG. 5 illustrates still another embodiment for displaying traffic along a representation of a portion of a road.

FIG. 5 shows another embodiment of the traffic display method. FIG. 5 shows a display 90 with a perspective view image 92 of a road 94 which is a portion of a road network located in a geographic region. As in the previous embodiment, the display 90 may be part of a system, such as a vehicle navigation system, a personal navigation system, a personal digital assistant, a mobile phone, a personal computer, or other device. The position of the user relative to the road 94 is indicated by a marker 91.

In FIG. 5, the image 92 is graphically enhanced to depict the portion of the road 94 realistically. For example, the road width is depicted, road lanes and colored lane markers have been added to the road 94, and 3D building outlines 93, roadside signs 95, and landscaping 97 have been added alongside the road 94.

In this embodiment, traffic conditions along the road 94 are measured. Information that indicates the traffic conditions is provided to the system of which the display 90 is a part. In the embodiment shown in FIG. 5, traffic is indicated on the selected road using animation 100, 102, 104. The animation 100, 102, 104 consists of a series of dots in which the dots simulate movement in the direction of traffic flow along the associated represented road 94.

In FIG. 5, a first part of the animation 100 is relatively slow moving because the traffic information indicates that traffic flow along this portion of the road is relatively slow. The second part of the animation 102 is relatively faster moving because the traffic information indicates that traffic flow along this portion of the road is relatively faster. The third part of the animation 104 is fastest moving because the traffic information indicates that traffic flow along this portion of the road is relatively fastest.

IV. Operation

Figure 6:
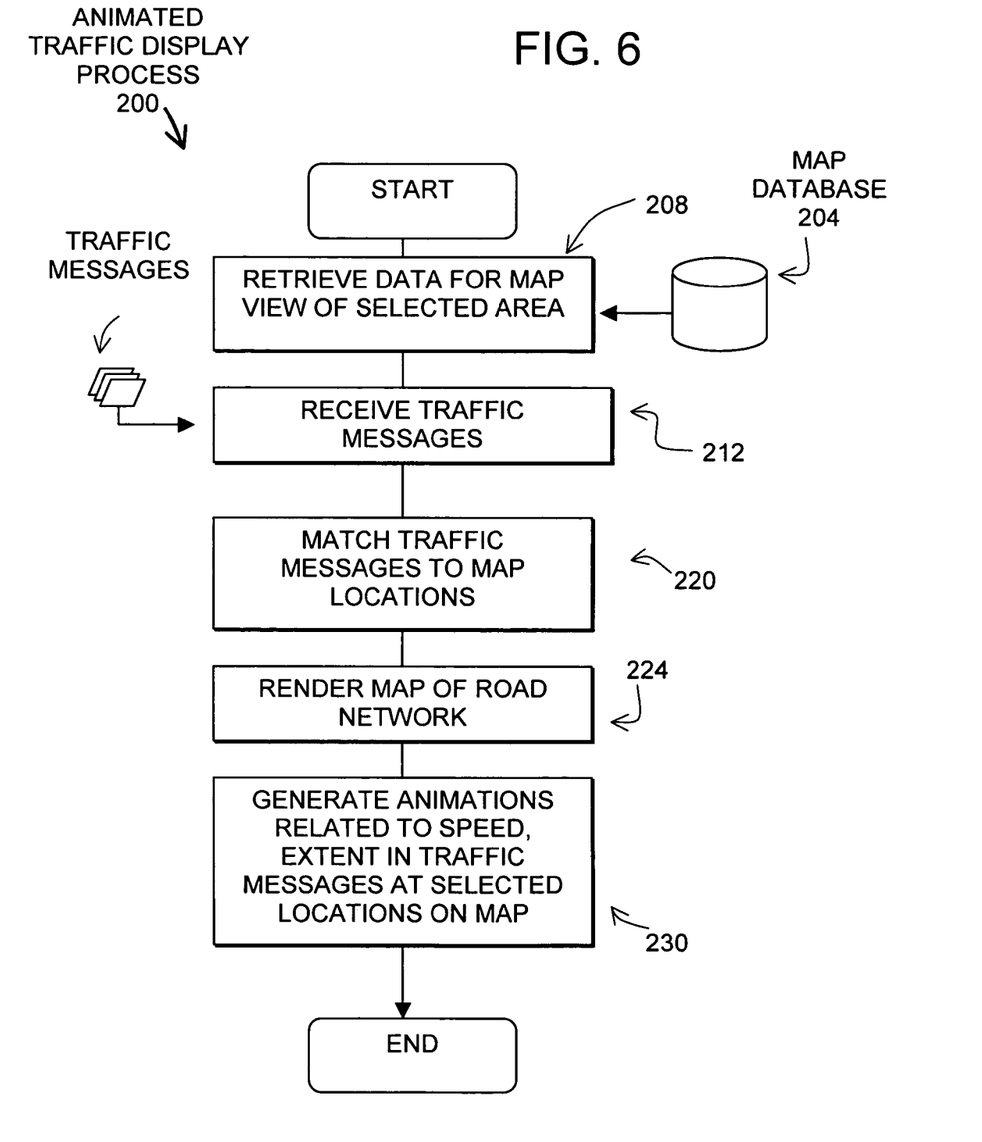
FIG. 6 is a flowchart showing a process for using animation to indicate traffic conditions on a portion of a road network being displayed.

FIG. 6 is a flowchart showing an exemplary process 200 for displaying traffic information using animation. The process 200 may be performed by one or more software programs running on one or more appropriate computer hardware platforms.

Data for rendering an image of a portion of a road network is obtained from a map database 204 (Step 208). Then, traffic information is obtained that relates to the portion of the road network being displayed (Step 212). The traffic information may consist of one or more traffic messages, each of which indicates a location along a road in a given direction and a traffic condition, e.g., the average vehicle speed or speed range. Each traffic message may also indicate the distance or extent along the road to which the condition applies. The traffic message may also include a duration for which the condition in the message is expected to exist. As mentioned above, the traffic messages may be in the ALERT-C format.

The traffic information is matched to locations on the image of the portion of a road network to be displayed (Step 220). Then, the image of the portion of the road network is rendered (Step 224). The image may actually be rendered on a display screen of the computer platform or may be stored temporarily in a memory so that it is ready for rendering. The image may be a 2D or overhead view of the road network (as shown in FIG. 2 or 3B). Alternatively, the image may be a 3D or perspective view (as shown in FIG. 4 or 5).

The process 200 also includes the step of generating one or more animations on the image of the portion of the road network being displayed (Step 230). In generating each animation, the information about the speed of the traffic is used to generate a simulated movement along the corresponding portion of the road network being displayed. The animation may be a line that extends along the corresponding portion of the road network being displayed. Alternatively, the animation may form the actual image of the road itself, i.e., the image of the road itself may be animated. The line may be in the form of dashes, dots, or other objects, components, pieces, icons, or things, or images, such as images of vehicles. The animation simulates the movement of the dashes (or dots, etc.) in a direction that corresponds to the direction of vehicle travel along the corresponding represented portion of the road network being rendered. The information about the speed of the actual traffic is used to set the speed of the simulated movement of the animation, i.e., the animation moves faster if the traffic information indicates that traffic is moving fast, whereas the animation moves relatively slower if the animation indicates the traffic is moving more slowly.

Another aspect of generating the animation relates to the length (size or extent) of the animation. The traffic information may indicate the extent along the road that the reported traffic condition exists. When rendering the animation, the size or length of the animation is related to the extent of the reported traffic condition.

The process 200 shown in FIG. 6 may be performed on various different computer platforms including networked or client-server platforms. For example, some of the steps in the process 200 may be performed on a server while other steps are performed on a client device. According to another example, the map may be rendered on a server and transferred to a client device where an applet generates an animation of the traffic using a traffic message obtained by the client device. In one embodiment, the animated traffic display is shown in a browser window.

The steps in the process 200 may be performed in a different sequence than the order shown in FIG. 6. For example, the traffic messages may be obtained before the data for rendering a road network. Likewise, some of the steps in the process 200 may be combined.

V. Alternatives

The disclosed method for displaying traffic using animation may be presented on a stylized or iconic view. A stylized or iconic view shows a portion of the road network with certain features removed in order to make it easier for a user to grasp. The stylized or iconic view can be a 2D or 3D view.

As stated above, when using animations that simulate movement to represent traffic conditions on roads, the speed of the simulated movement of the animation is related to the actual speed of the traffic on the actual road. This means that the animation moves faster to represent faster moving traffic conditions and slower to represent slower moving traffic conditions. However, the actual speed of the animation does not necessarily represent the actual speed of the measured traffic conditions. For example, if traffic is moving at 20 mph, dashes in an animation used to represent this traffic condition do not necessarily move at a 20 mph simulated pace on the representation of the road network. Instead, the pace of the simulation in the animation is selected to convey to the user the relative actual traffic speeds and not necessarily the actual traffic speeds.

In some of the embodiments described above, it was indicated that information indicating actual traffic conditions along a portion of a road was used to determine the simulated speed of movement of an animation rendered along a representation of the portion of the road on a display. According to an alternative, the traffic condition information may pertain to historical or predicted traffic conditions instead of actual measured traffic conditions. A combination of actual, historical and/or predicted traffic conditions may also be used.

It is intended that the foregoing detailed description be regarded as illustrative rather than limiting and that it is understood that the following claims including all equivalents are intended to define the scope of the invention.

I claim:

1. A method for displaying traffic information to an end user on a display comprising the steps of:
    displaying a representation of a portion of a road network on the display;
    indicating a relative position of the user on the representation of the portion of the road network being displayed; and
    using information that indicates traffic conditions on the portion of the road network being displayed to form an animation on the representation of the portion of the road network being displayed to represent the traffic conditions, wherein a relative speed of movement of the animation indicates the traffic speed along the portion of the road network being displayed.

2. The method of claim 1 wherein the portion of the road network being displayed is shown in perspective view.

3. The method of claim 1 wherein the portion of the road network being displayed is shown in a 2D overhead view.

4. The method of claim 1 wherein the animation moves faster to indicate faster traffic conditions and slower to indicate slower traffic conditions.

5. The method of claim 1 wherein the information indicates that the traffic conditions on one part of the portion of the road network being displayed are faster than on another part of the portion of the road network being displayed, and wherein the animation moves faster on the one part of the portion of the road network being displayed than on the other part of the portion of the road network being displayed.

6. The method of claim 1 wherein the animation is formed on a client device.

7. The method of claim 1 wherein the animation is formed on a server that sends an image that includes the representation of the portion of the road network and the animation to a client device.

8. The method of claim 1 wherein the information is a traffic message.

9. The method of claim 1 wherein the information is an ALERT-C format message.

10. The method of claim 1 wherein the animation simulates movement in a direction along the representation of the portion of the road network being displayed, and wherein the direction corresponds to a direction of vehicle travel along the representation of the portion of the road network being displayed.

11. The method of claim 1 further comprising:
    after the using step, obtaining updated information that indicates updated traffic conditions on the portion of the road network being displayed; and
    modifying the animation to represent the updated traffic conditions.

12. The method of claim 1 further comprising:
    accessing data from a map database; and
    using the data accessed from the map database for displaying the representation of the portion of the road network on the display.

13. The method of claim 1 wherein the display is part of a personal computer, a mobile phone, a personal digital assistant, an in-vehicle navigation system or a personal navigation system.

14. The method of claim 1 wherein the information that indicates traffic conditions indicates actual traffic conditions.

15. The method of claim 1 wherein the information that indicates traffic conditions indicates historical traffic conditions.

16. The method of claim 1 wherein the information that indicates traffic conditions indicates predicted traffic conditions.

17. A method for displaying traffic information on a display comprising the steps of:
    displaying a representation of a portion of a road network on the display;
    indicating a relative position of the user on the representation of the portion of the road network being displayed; and
    using information that indicates actual traffic conditions on the portion of the road network being displayed to form an animation that simulates movement along the representation of the portion of the road network being displayed, wherein the movement is in a direction of vehicle travel along the portion of the road network being displayed and wherein the movement is relatively faster when the information indicates that the actual traffic conditions are relatively fast, and wherein the movement is relatively slower when the information indicates that the actual traffic conditions are relatively slow.

18. The method of claim 17 wherein the portion of the road network being displayed is shown in perspective view.

19. The method of claim 17 wherein the portion of the road network being displayed is shown in a 2D overhead view.

20. The method of claim 17 wherein the information is an ALERT-C format message.

21. The method of claim 17 further comprising:
    after the forming step, obtaining updated information that indicates updated actual traffic conditions on the portion of the road network being displayed; and
    modifying the animation to represent the updated actual traffic conditions.

* * * * *